(12) United States Patent
Gurzoni, Jr. et al.

(10) Patent No.: US 11,580,731 B2
(45) Date of Patent: *Feb. 14, 2023

(54) SYSTEMS, DEVICES, AND METHODS FOR IN-FIELD DIAGNOSIS OF GROWTH STAGE AND CROP YIELD ESTIMATION IN A PLANT AREA

(71) Applicant: Adroit Robotics, Sao Paulo (BR)

(72) Inventors: Jose Angelo Gurzoni, Jr., Sao Paulo (BR); Plinio Thomaz Aquino, Jr., Sao Bernardo do Campo (BR); Milton Perez Cortez, Jr., Sao Paulo (BR)

(73) Assignee: Adroit Robotics, Sao Paulo (BR)

( * ) Notice: Subject to any disclaimer, the term of this patent is extended or adjusted under 35 U.S.C. 154(b) by 22 days.

This patent is subject to a terminal disclaimer.

(21) Appl. No.: 17/146,776

(22) Filed: Jan. 12, 2021

(65) Prior Publication Data
US 2021/0133443 A1  May 6, 2021

Related U.S. Application Data

(63) Continuation of application No. 16/031,801, filed on Jul. 10, 2018, now Pat. No. 10,891,482.

(51) Int. Cl.
*A01B 79/00* (2006.01)
*G06F 3/04817* (2022.01)
(Continued)

(52) U.S. Cl.
CPC .......... *G06V 20/188* (2022.01); *G06T 7/0002* (2013.01); *G06T 7/90* (2017.01);
(Continued)

(58) Field of Classification Search
None
See application file for complete search history.

(56) References Cited

U.S. PATENT DOCUMENTS 4,823,268 A * 4/1989 Giles ............... G01S 15/89
701/50
5,568,405 A 10/1996 Easton et al.
(Continued)

FOREIGN PATENT DOCUMENTS

EP 1473673 A2 11/2004
EP 3000305 A1 3/2016
(Continued)

OTHER PUBLICATIONS

Abhisesh Silwal, "Machine Vision System for Robotic Apple Harvesting in Fruiting Wall Orchards", A dissertation submitted in partial fulfillment of the requirement for the degree of Doctor of Philosophy, Washington State University, Department of Biological Systems Engineering, Dec. 2016, 24 pages.
(Continued)

*Primary Examiner* — Soo Shin
(74) *Attorney, Agent, or Firm* — TraskBritt

(57) ABSTRACT

Methods, devices, and systems may be utilized for detecting one or more properties of a plant area and generating a map of the plant area indicating at least one property of the plant area. The system comprises an inspection system associated with a transport device, the inspection system including one or more sensors configured to generate data for a plant area including to: capture at least 3D image data and 2D image data; and generate geolocational data. The datacenter is configured to: receive the 3D image data, 2D image data, and geolocational data from the inspection system; correlate the 3D image data, 2D image data, and geolocational data; and analyze the data for the plant area. A dashboard is configured to display a map with icons corresponding to the proper geolocation and image data with the analysis.

18 Claims, 11 Drawing Sheets

(51) Int. Cl.
| | |
|---|---|
| *G06K 9/62* | (2022.01) |
| *G06Q 50/02* | (2012.01) |
| *G06T 17/05* | (2011.01) |
| *G06T 7/00* | (2017.01) |
| *G06T 7/90* | (2017.01) |
| *G06V 10/26* | (2022.01) |
| *G06V 10/80* | (2022.01) |
| *G06V 10/98* | (2022.01) |
| *G06V 20/00* | (2022.01) |
| *G06V 20/10* | (2022.01) |
| *G06V 20/17* | (2022.01) |
| *G06V 20/64* | (2022.01) |

(52) U.S. Cl.
CPC .......... *G06T 17/05* (2013.01); *G06F 3/04817* (2013.01); *G06T 2200/24* (2013.01); *G06T 2207/10024* (2013.01); *G06T 2207/10028* (2013.01); *G06T 2207/10048* (2013.01); *G06T 2207/30168* (2013.01); *G06T 2207/30188* (2013.01)

(56) References Cited

U.S. PATENT DOCUMENTS

| | | |
|---|---|---|
| 5,790,428 A | 8/1998 | Easton et al. |
| 6,073,427 A | 6/2000 | Nichols |
| 7,089,117 B2 | 8/2006 | Maertens |
| 7,702,597 B2 | 4/2010 | Singh et al. |
| 7,979,209 B2 | 7/2011 | O'Hara et al. |
| 8,712,144 B2 | 4/2014 | Mas et al. |
| 8,737,720 B2 | 5/2014 | Mas et al. |
| 8,855,405 B2 | 10/2014 | Mas et al. |
| 9,107,354 B2 | 8/2015 | Martin et al. |
| 9,152,938 B2 | 10/2015 | Lang et al. |
| 2001/0016053 A1* | 8/2001 | Dickson ................ G01J 1/4204 382/110 |
| 2004/0194442 A1 | 10/2004 | Maertens |
| 2004/0264761 A1 | 12/2004 | Mas et al. |
| 2004/0264762 A1 | 12/2004 | Mas et al. |
| 2004/0264763 A1* | 12/2004 | Mas ...................... G06V 10/147 382/154 |
| 2005/0234691 A1 | 10/2005 | Singh et al. |
| 2006/0276968 A1 | 12/2006 | O'hara et al. |
| 2009/0099776 A1 | 4/2009 | Kapadi et al. |
| 2013/0325346 A1 | 12/2013 | McPeek |
| 2016/0084813 A1 | 3/2016 | Anderson et al. |
| 2016/0084987 A1* | 3/2016 | Dybro .................. A01B 79/005 702/5 |
| 2016/0157414 A1 | 6/2016 | Ackerman et al. |
| 2016/0224703 A1 | 8/2016 | Shriver |
| 2016/0290918 A1 | 10/2016 | Xu et al. |
| 2016/0352979 A1* | 12/2016 | Ilic .......................... G06T 11/60 |
| 2017/0071188 A1* | 3/2017 | Rees ..................... B05B 12/122 |
| 2017/0089742 A1 | 3/2017 | Bruns et al. |
| 2017/0161627 A1 | 6/2017 | Xu et al. |
| 2017/0223947 A1* | 8/2017 | Gall ...................... A01B 79/005 |
| 2017/0228743 A1 | 8/2017 | Cousins et al. |
| 2017/0372137 A1* | 12/2017 | Kumar ................... H04N 7/185 |
| 2018/0259496 A1* | 9/2018 | McPeek ............... G01N 33/025 |
| 2018/0330473 A1* | 11/2018 | Foi ........................... G06T 7/337 |
| 2021/0133443 A1* | 5/2021 | Gurzoni, Jr .......... G06V 20/188 |

FOREIGN PATENT DOCUMENTS

| | | |
|---|---|---|
| EP | 3008990 A2 | 4/2016 |
| JP | 2010-166851 A | 8/2010 |
| JP | 2012-203875 A | 10/2012 |
| JP | 2015-000049 A | 1/2015 |
| JP | 2015-188333 A | 11/2015 |
| JP | 6147579 B2 | 6/2017 |
| KR | 10-2018-0066439 A | 6/2018 |
| WO | 02/41687 A2 | 5/2002 |
| WO | 2005/057129 A1 | 6/2005 |
| WO | 2006/113584 A2 | 10/2006 |
| WO | 2011/061640 A2 | 5/2011 |
| WO | 2014/203664 A1 | 12/2014 |
| WO | 2016/004026 A1 | 1/2016 |
| WO | 2016/123201 A1 | 8/2016 |
| WO | 2016/124950 A1 | 8/2016 |
| WO | 2016/160384 A1 | 10/2016 |
| WO | 2016/193602 A1 | 12/2016 |
| WO | 2017/021285 A1 | 2/2017 |
| WO | 2017/044484 A1 | 3/2017 |
| WO | 2017/096073 A1 | 6/2017 |

OTHER PUBLICATIONS

Barnea et al., "Colour-agnostic shape-based 3D fruit detection for crop harvesting robots", Biosystems Engineering, vol. 146, 2016 pp. 57-70.

Bietresato et al., "Evaluation of a LiDAR-based 3D-stereoscopic vision system for crop-monitoring applications", Computers and Electronics in Agriculture, vol. 124, 2016, pp. 1-13.

Bulanon et al., "Image fusion of visible and thermal images for fruit detection", Biosystems Engineering, vol. 103, 2009, pp. 12-22.

Cheein et al., "Real-time approaches for characterization of fully and partially scanned canopies in groves", Computers and Electronics in Agriculture, vol. 118, 2015, pp. 361-371.

David J. Mulla, "Twenty five years of remote sensing in precision agriculture: Key advances and remaining knowledge gaps", Biosystems Engineering, vol. 114, 2013, pp. 358-371.

Dorj et al., "A Counting Algorithm for Tangerine Yield Estimation", ASTL, vol. 21, 2013, pp. 279-282.

Dorj et al., "An yield estimation in citrus orchards via fruit detection and counting using image processing", Computers and Electronics in Agriculture, vol. 140, 2017, pp. 103-112.

Gongal et al., "Apple crop-load estimation with over-the-row machine vision system", Computers and Electronics in Agriculture, vol. 120, 2016, pp. 26-35.

International Search Report for International Application No. PCT/IB2019/053614, dated Sep. 6, 2019, 16 pages.

International Written Opinion for International Application No. PCT/IB2019/053614, dated Sep. 6, 2019, 09 pages.

Lee et al., "Sensing systems for precision agriculture in Florida", Computers and Electronics in Agriculture, vol. 112, 2015, pp. 2-9.

Lee et al., "Sensing technologies for precision specialty crop production", Computers and Electronics in Agriculture, vol. 74, 2010, pp. 2-33.

Mendez et al., "LiDAR simulation in modelled orchards to optimise the use of terrestrial laser scanners and derived vegetative measures", Biosystems Engineering, vol. 115, 2013, pp. 7-19.

Narvaez et al., "LiDAR and thermal images fusion for ground-based 3D characterisation of fruit trees", Biosystems Engineering, vol. 151, 2016, pp. 479-494.

Noori et al., "Site-specific management of common olive: Remote sensing, geospatial, and advanced image processing applications", Computers and Electronics in Agriculture, vol. 127, 2016, pp. 680-689.

Payne et al., "Estimation of mango crop yield using image analysis—Segmentation method", Computers and Electronics in Agriculture, vol. 91, 2013, pp. 57-64.

Polo et al., "A tractor-mounted scanning LIDAR for the non-destructive measurement of vegetative volume and surface area of tree-row plantations: A comparison with conventional destructive measurements", Biosystems Engineering, vol. 102, 2009, pp. 128-134.

Rosell et al., "Obtaining the three-dimensional structure of tree orchards from remote 2D terrestrial LIDAR scanning", Agricultural and Forest Meteorology, vol. 149, 2009, pp. 1505-1515.

Ruiz-Altisent et al., "Sensors for product characterization and quality of specialty crops—A review", Computers and Electronics in Agriculture, vol. 74, 2010, pp. 176-194.

Sanz et al., "Relationship between tree row LIDAR-volume and leaf area density for fruit orchards and vineyards obtained with a Lidar 3D Dynamic Measurement System", Agricultural and Forest Meteorology, vol. 171-172, 2013, pp. 153-162.

(56) References Cited

OTHER PUBLICATIONS

Shalal et al., "Orchard mapping and mobile robot localisation using on-board camera and laser scanner data fusion—Part A: Tree detection", Computers and Electronics in Agriculture, vol. 119, 2015, pp. 254-266.

Shalal et al., "Orchard mapping and mobile robot localisation using on-board camera and laser scanner data fusion—Part B: Mapping and localisation", Computers and Electronics in Agriculture, vol. 119, 2015, pp. 267-278.

Underwood et al., "Mapping almond orchard canopy volume, flowers, fruit and yield using lidar and vision sensors", Computers and Electronics in Agriculture, vol. 130, 2016, pp. 83-96.

Vázquez-Arellano et al., "3-D Imaging Systems for Agricultural Applications—A Review", Sensors, vol. 16, 618,2016, 24 pages.

Wang et al., "Automated Crop Yield Estimation for Apple Orchards", In Proc. International Symposium on Experimental Robotics, Jun. 2012, 15 Pages.

Wijethunga et al., "Digital Image Analysis Based Automated Kiwifruit Counting Technique" 23rd International Conference Image and Vision Computing, 2008, 6 pages.

Yi Lin, "LiDAR: An important tool for next-generation phenotyping technology of high potential for plant phenomics?", Computers and Electronics in Agriculture, vol. 119, 2015, pp. 61-73.

Zhang et al., "Innovative Technology for Apple Harvest and In-field Sorting", Fruit Quarterly, vol. 25, No. 2, Summer 2017, 4 pages.

\* cited by examiner

SYSTEMS, DEVICES, AND METHODS FOR IN-FIELD DIAGNOSIS OF GROWTH STAGE AND CROP YIELD ESTIMATION IN A PLANT AREA

CROSS-REFERENCE TO RELATED APPLICATION

This application is a continuation of U.S. patent application Ser. No. 16/031,801, filed Jul. 10, 2018, now U.S. Pat. No. 10,891,482, issued Jan. 12, 2021, the disclosure of which is hereby incorporated herein in its entirety by this reference.

FIELD

The disclosure relates generally to systems and methods for in-field diagnosis of growth stage and crop yield estimation. In particular, the disclosure relates to systems, devices, and methods for in-field diagnosis of the growth stage and crop yield estimation in a plant area and generating a three-dimensional map showing the results.

BACKGROUND

Accurate and timely machine counting of fruit on the tree or vine has long been considered impossible or impractical. Conventional methods rely on manual estimation and are often inaccurate and labor intensive. Inaccurate estimates lead to inaccurate crop forecasts and complicate pricing and farmers' ability to forecast and plan.

Accurate crop yield estimation may help farmers improve fruit quality and reduce operating cost by making better decisions on intensity of fruit thinning and size of the harvest labor force. The packing industry may be benefitted as well, because managers can use estimation results to optimize packing and storage capacity. Typical crop yield estimation is performed based on historical data, weather conditions, and workers manually counting fruit in multiple sampling locations. This process is time-consuming and labor-intensive, and the limited sample size is usually not enough to reflect the yield distribution across, for example, an entire the orchard. Therefore, the common crop yield estimation practices are inaccurate and inefficient.

Recently, three-dimensional and image-based sensing have been applied to many aspects of tree-crop precision agriculture. There are many examples of the use of LiDAR ("Light Detection and Ranging") scanners to measure tree canopy geometry. Alternative range sensors have also been used including ultrasound, structured light, and stereo vision, but LiDAR is popular given the relatively high accuracy and invariance under natural illumination conditions.

Vision sensors have been coupled with machine vision algorithms to estimate fruit and flower densities for individual trees for a number of different crop types. Digital cameras and relatively simple image classification algorithms have been used to estimate flower densities. Relatively simple algorithms are possible due to the typically high color contrast exhibited by flowers. Machine vision cameras have also been mounted on tractors to improve the image acquisition, which allowed flower estimation on larger numbers of trees. Nevertheless, the process requires manual demarcation of the individual trees within the frames, which limits the efficiency when scaling up to scan entire commercial orchard blocks.

Unlike flowers, fruit and nuts are often visually similar to the leaves and surrounding foliage of trees, meaning that more sophisticated machine vision methods are required to automatically detect them.

BRIEF SUMMARY

In some embodiments, the present disclosure includes a crop yield estimation system for detecting one or more properties of a plant area. The system comprises an inspection system associated with a transport device, the inspection system including one or more sensors configured to generate data for a plant area including to: capture at least 3D image data and 2D image data; and generate geolocational data. The datacenter is configured to: receive the 3D image data, 2D image data, and geolocational data from the inspection system; correlate the 3D image data, 2D image data, and geolocational data; and analyze the data for the plant area. A dashboard is configured to display a map with icons corresponding to the proper geolocation and image data with the analysis.

In still other embodiments, the present disclosure includes a system for generating a map of an area of plants indicating at least one property of the area of plants. The system may comprise an inspection system, a datacenter in communication with the inspection system, and a dashboard. The inspection system may be configured to generate area data from the area of plants. The datacenter may be configured to analyze the area data, characterize the area data, and generate analysis results, and generate the map of the area using the analysis results in which an indication of the at least one property is visible in the map and wherein the location of the at least one property within the digital model corresponds to one or more locations of the at least one property in the area of plants. The dashboard may be configured to display the map.

In still other embodiments, the present disclosure includes a method for generating a map of an area of plants indicating one or more properties of one or more plants in the area of plants. The method may comprise moving an inspection system across the area of plants; collecting, with the inspection system, area data comprising laser-scan data (e.g., LiDAR scan data, stereoscopic cameras, etc.), image data, environment data, and geo-reference data; pre-processing, with the inspection system, the area data; geo-referencing, with the inspection system, the area data; communicating, with the inspection system, the area data to a datacenter remote to the inspection system; analyzing, with the datacenter, the area data and generating analysis results; generating, with the datacenter, a map using the analysis results and the geo-reference data in which an indication of the one or more properties is visible in the map and the location of the one or more properties in the digital map corresponds to the location of the one or more properties in the area of plants; and displaying the map on dashboard viewable by a user.

DETAILED DESCRIPTION

Figure 1:
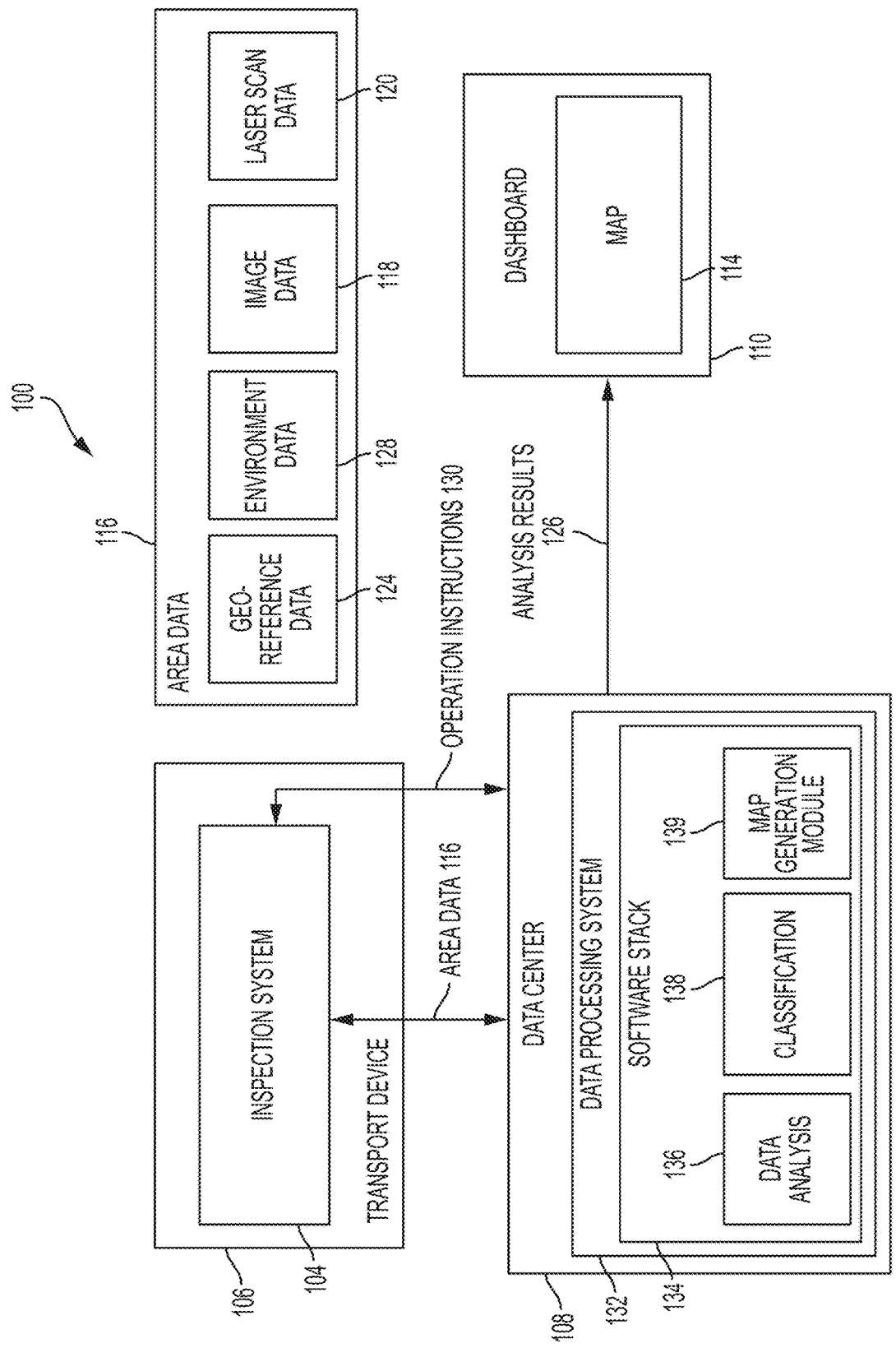
FIG. 1 is a block diagram of a crop yield estimation system according to an embodiment of the present disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, system, and process changes may be made without departing from the scope of the disclosure. The illustrations presented herein are not meant to be actual views of any particular process, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, structure, configuration, logic, or any other property.

Furthermore, specific implementations shown and described are only examples and should not be construed as the only way to implement the present disclosure unless specified otherwise herein. Elements, connections, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof.

Some drawings may illustrate information and signals as a single data packet or single signal for clarity of presentation and description. It will be understood by a person of ordinary skill in the art that the data packet or signal may represent a bus of signals or series of data packets. A bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an integrated circuit (IC), an application specific integrated circuit (ASIC), a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure. Examples of computers include personal computers, workstations, laptops, tablets, mobile phones, wearable devices, and computer-servers.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Many of the functional units described may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors. An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

As used in this specification, the terms "substantially," "about," and "approximately" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Embodiments of the disclosure include a sensor apparatus, system, and related method for performing for in-field diagnosis of growth stage and crop yield estimation of fruit orchards. More particularly, disclosed embodiments generally relate to systems and methods for capturing area data, the area data comprising: laser-scan data (e.g., 3D laser scans), image data (e.g., images captured by a high-definition visual camera), environment data (e.g., temperature, humidity, sunlight levels, etc.), and geo-referencing data (e.g., global positioning system (GPS) data); analyzing the data using machine learning and statistical algorithms; comparing the data with a database containing samples of different fruit types and harvest stages; making classifications (e.g., quantity, size, and stage of the fruit's ripeness; presence and quantity of flowers, state of the tree health through leaf coloring; possibility of abnormalities such as diseases and nutrient deficiencies of the tree, and other suitable classifications); and generating a map showing the analysis results.

The sensor apparatus may be mounted on machinery (e.g., tractors), autonomous robots, or other transport devices, and be used to capture sensor data about the state of the plant area on periodic intervals (e.g., every two weeks). The transport device may move along, for example, orchard while the inspection system collects orchard data. For example, the inspection device may collect: image data from one or more high-definition cameras; laser scan data from a 2D or 3D laser scanner; geo-reference data (e.g., latitude and longitude) from a survey-grade global positioning system (GPS); and environment data (e.g., temperature, humidity, air pressure, sunlight levels, etc.) from a plurality of environment sensors (e.g., thermometer, hygrometer, barometer, etc.). The data may then by uploaded to a datacenter facility that implements a suite of software with machine learning (e.g., deep learning techniques) and statistical algorithms to analyze the data. In particular, the datacenter facility may compare the collected data against a database containing several samples of different fruit types and harvest stages, and classifies the following: quantity, size and stage of the fruits' ripeness; presence and quantity of flowers; state of the tree health through its leaves coloring; possibility of abnormalities such as diseases and nutrient deficiencies of the tree. With the classified information, the datacenter may also compare historical data of the plant area and generate a map with the resulting analysis, which may then be presented to the user (e.g., a farmer or other client). The datacenter may analyze the resulting analysis to generate automated recommendations on the dosing of fertilizers and pesticides on a detailed level (e.g., cells of few meters size).

FIG. 1 is a block diagram of a crop yield estimation system 100 (also referred to as "system 100") according to an embodiment of the present disclosure. The crop yield estimation system 100 includes an inspection system 104, a transport device 106, a datacenter 108, and a dashboard 110. The inspection system 104 may be mounted to the transport device to survey a plant area to determine one or more properties (e.g., growth stage, estimated crop yield, estimated plant health, etc.) thereof. The plant area to be surveyed may take various forms. For example, the plant area may include an orchard, a farm, a grove, a tree farm, a plantation, a nursery, a vineyard, and/or some other suitable area containing plants to be surveyed. The datacenter 108 may be located remote to the inspection system 104. The datacenter 108 may provide the processing and analysis for a number of different users (i.e., clients) of the system 100 subscribed to the service provided thereby. The dashboard 110 may be located remote to the inspection system 104 and the datacenter 108, and be associated with a particular user of the system 100.

The inspection system 104 may comprise one or more devices and/or sensors configured to inspect the plant area to be surveyed and to generate data about the plant area. For example, an inspection system 104 may comprise one or more of a 3D laser scanner (LiDAR), a 2D laser scanner (LiDAR), a stereoscopic camera, an inertial movement unit (IMU), an actinometer, an altimeter, an anemometer, a barometer, a clock, a disdrometer, a global positioning system (GPS), a survey grade GPS, a real-time kinematic (RTK) positioning system, a high-resolution camera, a high-resolution infrared (IR) camera, a hygrometer, a pyrheliometer, a psychrometer, a pyranometer, a rain gauge, a thermometer, a solar irradiance sensor, a radio transceiver, and other suitable devices and/or sensors.

The inspection system 104 may be a separate device mounted on the transport device 106. In some embodiments the inspection system 104 may be integrated with the transport or mobile platform. The transport device or mobile platform 106 may take various forms. For example, the transport device 106 may comprise a vehicle such as a tractor or other farm machinery, an all-terrain vehicle (ATV), a four-wheeler, an aerial drone or other aerial device, a robot, or other suitable transport device. In some embodiments, the transport device 106 may be configured to operate autonomously (e.g., an autonomous vehicle). In other embodiments, the transport device 106 may be configured to operate under human control.

In some embodiments, portions of the inspection system 104 may be mounted on the transport device or mobile platform 106 while other portions of the inspection system 104 may be stationary. For example, in one embodiment the inspection system 104 may comprise a laser scanner, a survey-grade GPS, a rain gauge, a thermometer, and a hygrometer. The laser scanner and survey-grade GPS may be mounted on a mobile platform or transport device 106, while the rain gauge, thermometer, and hygrometer may be stationary. In other embodiments, portions of the inspection system 104 may be mounted on one or more transport devices or mobile platforms 106 while other portions of the inspection system 104 may be stationary.

In operation, the inspection system 104, utilizing suitable sensors and devices as described above, may generate area data 116. The area data 116 may comprise image data 118, laser scan data 120, geo-reference data 124, and environment data 128.

The image data 118 may comprise images recorded by one or more high-resolution cameras, high-resolution IR cameras, and/or other suitable cameras. In some embodiments the images may be high-resolution color images. In other embodiments, the images may be high-resolution IR images. The inspection system 104, utilizing a high-resolution camera and/or a high-resolution IR camera, may be configured to generate the image data 118.

The laser scan data 120 may comprise range data collected from one or more 2D laser scanners, 3D scanners, other type of LiDAR ("Light Detection and Ranging") scanners, or other type of range measurement devices. The range data may comprise 3D coordinate data (x, y, z coordinates) relative to the 3D scanner, or some other suitable point of origin. The inspection system 104 may be configured to generate the laser scan data 120 (x, y, z coordinates) of plants within the plant area to be surveyed relative to the 3D scanner, or some other suitable point of origin. 3D scanner is a colloquial term used to describe a device used for light detection and ranging (LiDAR) which is an optical remote sensing technology that can measure the distance to, or other properties of a target by illuminating the target with light. LiDAR can be found in two common forms: direct energy detection, also known as incoherent, and coherent detection. Coherent systems are typically preferred for measurement systems. Both systems are currently available in two pulse formats: micropulse and high-energy systems. The micropulse systems are eyesafe and require less energy to operate by this comes at the expense of higher computational post-processing requirements. LiDAR systems currently in use are capable of collecting nearly one million points per second. 3D laser scanners are commercially available (e.g., from Tiger Supplies Inc., Irvington, N.J.; Laser Design and GKS Services, Minneapolis, Minn.; Riegl USA, Orlando, Fla. and Faro USA, Lake Mary, Fla.). In some embodiments, waveform LiDAR may be utilized.

The geo-reference data 124 may comprise, for example, latitude and longitude data. The geo-reference data 124 may be collected from one or more global positioning systems, survey-grade global positioning systems, real-time kinematic positioning systems, inertial movement units (IMUs), or other type of geo-reference device.

The environment data 128 may comprise temperature, humidity, sunlight levels, wind speed, wind direction, altitude, air pressure, time, or other suitable properties. The environment data 128 may be collected utilizing various sensors. For example, utilizing a thermometer, the inspection system 104 may be configured to collect temperature data. As another example, utilizing a hygrometer, the inspection system 104 may be configured to collect humidity data. In still other examples, the inspection system 104, utilizing multiple sensors/devices including for example, an actinometer, an altimeter, an anemometer, a barometer, a clock, a disdrometer, a hygrometer, a pyrheliometer, a psychrometer, a pyranometer, a rain gauge, a thermometer, and/or a solar irradiance sensor, may be configured to collect various data, which may include: sunlight level; altitude; wind speed; air pressure; time; size, speed, and velocity of rain drops; humidity; light intensity; amount of rain; temperature; and/or wind direction.

All elements of the inspection system 104, whether stationary or mobile, may be configured to communicate area data 116 to the datacenter 108. The inspection system 104 may communicate area data 116 to the datacenter 108 utilizing a direct up-link, a wireless network, a radio-link, or other connection whereby the area data 116 may be communicated to, and received by, the datacenter 108. The area data 116 may be transmitted to the datacenter 108 as a combination packet containing all forms of the area data 116, or with some data being transmitted as separate data streams to the datacenter 108.

The inspection system 104 may also be configured, utilizing a radio transceiver or other suitable wireless communications system, to receive and execute operation instructions 130 from the datacenter 108. The operation instructions 130 may include, for example, to begin collection of data, to stop collection of data, when to collect data, and when to stop collection of data. Where the inspection system 104 is integrated with the transport device 106, operation instructions 130 may include, for example, to move to a certain geographical point or points, when to go to a certain geographical point or points, to follow a route, to stop following a route, to return to base, and other suitable operation instructions 130. In autonomous mode, the transport device 106 may have a route programmed therein without requiring operation instructions each time data is to be captured. The datacenter 108 may be configured, utilizing a transceiver or other suitable wireless communication system, to receive area data 116 and to communicate operation instructions 130 to the inspection system 104 and/or the transport device or mobile platform 106.

The inspection system 104 or the transport device 106 may also receive a map of the plant area (e.g., an orchard map) and a list of tasks to be performed from a remote controller station. As a result, the transport device 106 approaches the areas where data is to be collected and automatically starts data collection when it is determined to be in the proper location within the orchard map. The inspection system 104 may also be configured to perform some level of pre-processing the data prior to transmission to the datacenter 108. Pre-processing the data may include verification of camera image quality, adjustment of lenses parameters (e.g., zoom, iris, shutter speed), verification of the LiDAR scan readings, geo-referencing, compression, and local storage of data. Once these tasks are finished, the inspection system 104 may upload the compressed data to the datacenter 108, where the next stage of processing may occur.

The datacenter 108 includes the data processing system 132 comprising the software stack 134. The software stack 134 may include a data analysis module 136, a data classification module 138, and/or a map generation module 139. The software stack 134 may receive and analyze the area data 116 to generate analysis results 126, which may be communicated to the dashboard 110. The analysis results 126 may include the map 114, which may relate the image data 118, the laser scan data 120, the geo-reference data 124, and the environment data 128. The map generation module 139 may include 2D or 3D computer graphics software, 2D or 3D modeling applications, and/or 2D or 3D modelers. The map 114 may be generated by developing a mathematical representation of the plant area. The datacenter 108 may also be configured to generate various notifications, alerts, and/or recommendations based on the analysis results.

The dashboard 110 may be viewable to the user on one or more displays and/or touchscreen displays (e.g., a monitor) of a computing device (e.g., smartphone, laptop computer, desktop computer, tablet computer, etc.) associated with a user. For example, the map 114 may be presented on a graphical user interface including graphical representations (e.g., 2D and/or 3D) graphical representations, indicating within the map 114 and/or modeling the various properties within the surveyed plant area. The various properties may include growth stage, estimated crop yield, estimated plant health, disease estimate, nutrient deficiency estimate, fruit quantity, flower quantity, fruit size, fruit diameter, tree or vine height, trunk or stem diameter, trunk or stem circumference, tree or vine volume, canopy volume, color, leaf color, leaf density, temperature, humidity, sunlight levels, abnormalities, wind speed, wind direction, altitude, air pressure, time, historical data, or other suitable properties.

The map 114 may depict a representation of the plant area using a collection of points in 2D or 3D space, connected by various geometric entities such as triangles, lines, curved surfaces, etc. In the case of a 3D map, the map 114 may be viewed in various directions, angles, and views. Seeing the plant area this way may enable the viewer to see changes or improvements that need to be made to the plant area (e.g., fertilization, pesticide, or irrigation/water changes). In some embodiments, the map 114 may show individual plants or groups of plants on the plant area. The map 114 may show analysis results 126. The analysis results 126 may comprise one or more properties within each individual plant or group plants on the area surveyed, environment data 128, and other suitable data. The map 114 may have different colors or gray scales, representing the analysis results 126.

Figure 2:
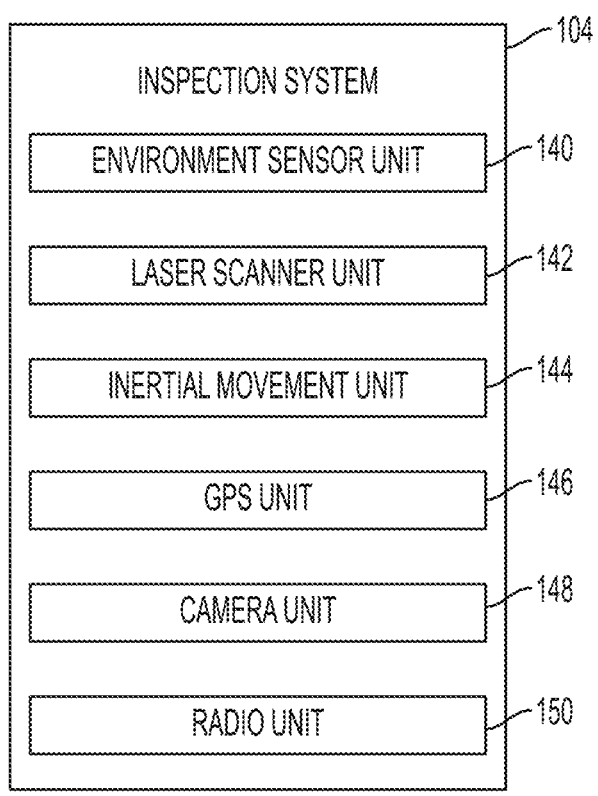
FIG. 2 is a simplified block diagram of the inspection system of FIG. 1.

FIG. 2 is a simplified block diagram of the inspection system 104 of FIG. 1. The inspection system 104 may comprise an environment sensor unit 140, a laser scanner unit 142, an inertial movement unit (IMU) 144, a GPS unit 146, a camera unit 148, and a radio unit 150. Each of these units may be operably coupled to a processor configured to coordinate communication therebetween as well as with communication elements to communicate with remote devices (e.g., datacenter 108). In some embodiments, each unit may be configured to transmit its captured data as a separate data stream to the datacenter 108, while some data may be processed and transmitted as a combination packet to the datacenter 108. The inspection system 104 may also include a memory device coupled to the processor configured to store data locally and well as to store instructions thereon.

The environment sensor unit 140 may comprise multiple sensors and/or devices configured to collect various environmental data. For example, the environment sensor unit 140 may include one or more of an actinometer, an altimeter, an anemometer, a barometer, a clock, a disdrometer, a hygrometer, a pyrheliometer, a psychrometer, a pyranometer, a rain gauge, a thermometer, and/or a solar irradiance sensor. The environmental data collected may include sunlight level, altitude, wind speed, air pressure, time, size, speed, and velocity of rain drops, humidity, light intensity, amount of rain, temperature, and/or wind direction.

The laser scanner unit 142 may comprise one or more 2D and/or 3D laser scanners, as discussed above. The laser scanner unit 142 may be configured to generate the laser scan data (x, y, and/or z coordinates) of plants on the area to be surveyed relative to the laser scanner unit 142, or some other suitable point of origin.

The inertial movement unit 144 may comprise an electronic device that measures outputs, for example, the inspection system's 104 specific force and angular rate using a combination of accelerometers and gyroscopes. In some embodiments the GPS unit 146 may be an IMU-enabled GPS unit. The inertial movement unit 144 may enable a GPS receiver to operate when GPS-signals are unavailable.

The inertial movement unit 144 may be configured to measure any inclination or vibration the inspection system 104 may experience during data collection. For example, the IMU 144 may measure any inclination or vibration the laser scanner was experiencing during data collection, which may be used to augment the precision of the laser scan data. Likewise, inertial movement unit data 121 may be used to enhance the precision of the geo-reference data.

The GPS unit 146 may comprise a GPS receiver configured to receive information from GPS satellites (e.g., geo-location and time data) and then calculate the device's geographical position. The GPS unit 146 may comprise a survey-grade GPS receiver. Survey grade GPS receivers offer a range of position accuracy. Depending on the particular receiver, the range may vary from within 1 meter to within 1 millimeter as non-limiting examples.

The camera unit 148 may comprise one or more high-definition color (e.g., RGB), infrared (IR), and/or short-wave infrared (SWIR) cameras. The camera unit 148 may comprise one or more camera modules. The camera unit 148 may be capable of capturing images at multiple focal lengths. The camera unit 148 may be configured to combine multiple exposures into a single high-resolution image.

The radio unit 150 may comprise a radio transceiver, or other suitable means, configured to communicate with the datacenter 108. For example, the radio unit 150 may be configured to send area data 116 to the datacenter 108. The communications unit may also be configured to receive operation instructions 130 to the datacenter 108. In some embodiments, the radio unit 150 may be configured during data collection to send, constantly or periodically, the location of the inspection system 104 to the datacenter 108.

Figure 3:
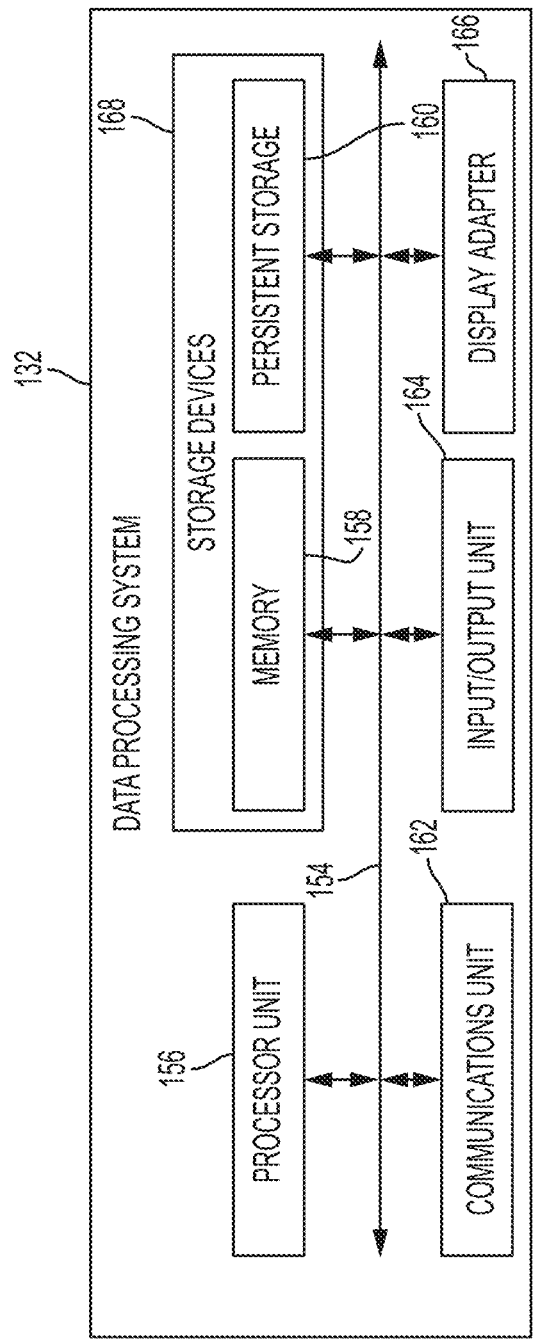
FIG. 3 is a block diagram of the data processing system of FIG. 1.

FIG. 3 is a block diagram of the data processing system 132 of the datacenter 108 of FIG. 1. The data processing system 132 may comprise a processor unit 156, storage devices 168 (e.g., memory 158, persistent storage 160), a communications unit 162, an input/output unit 164, and a display adapter 166 coupled to communicate via a communications framework 154 (e.g., communication bus).

The processor unit 156 may execute instructions for software that may be loaded into memory 158. The processor unit 156 may be a number of processors, a multi-processor core, or some other type of processor.

Storage devices 168 include hardware configured to store information, such as, for example, data, program code in functional form, and/or other suitable information either on a temporary basis and/or a permanent basis. Storage devices 168 may also be referred to as computer readable storage devices or computer readable media in this disclosure. Memory 158 may be random access memory or any other suitable volatile or non-volatile storage device. Persistent storage 160 may take various forms. For example, persistent storage 160 may comprise one or more components or devices. For example, persistent storage may be a hard drive, a flash memory, a rewritable optical disk, or some combination of the above.

The communications unit 162 may be configured to provide communications with other data processing systems or devices that may be connected to the data processing system 132. The communications unit 162 includes components, such as a transmitter, receiver, transceiver, network interface card, etc.

The input/output unit 164 may be configured to allow for input and output of data from/to a user or administrator of the datacenter 108.

The display adapter 166 may provide a mechanism to display information on a display device that is viewable by the user or administrator of the datacenter 108.

Instructions for the operating system, applications, and/or programs may be located in the storage devices 168, which are in communication with the processor unit 156 through the communications framework 154. The processes of the different embodiments may be performed by the processor unit 156 using computer implemented instructions, which may be located in memory 158. These instructions are referred to as program code, computer usable program code, or computer readable program code that may be read and executed by the processor unit 156. The program code in the different embodiments may be embodied on different physical or computer readable storage media, such as memory 158 or persistent storage 160.

Additionally, the program code may be located in a functional form on computer readable media that may be selectively removable and may be loaded onto or transferred to the data processing system 132 for execution by the processor unit 156. The program code and computer readable media form the computer program product. In one embodiment computer readable media may be computer readable storage media. Computer readable storage media may be a physical or tangible storage device used to store program code rather than a medium that propagates or transmits program code. Alternatively, program code may be transferred to the data processing system 132 over a wireless communications link.

The different components illustrated for the data processing system 132 are not meant to provide architectural limitations to the manner in which different embodiments may be implemented. The different illustrative embodiments may be implemented in a data processing system including components in addition to and/or in place of those illustrated for the data processing system 132. Other components show in FIG. 3 can be varied from the examples shown. The different embodiments may be implemented using any hardware device or system capable of running program code.

Figure 4:
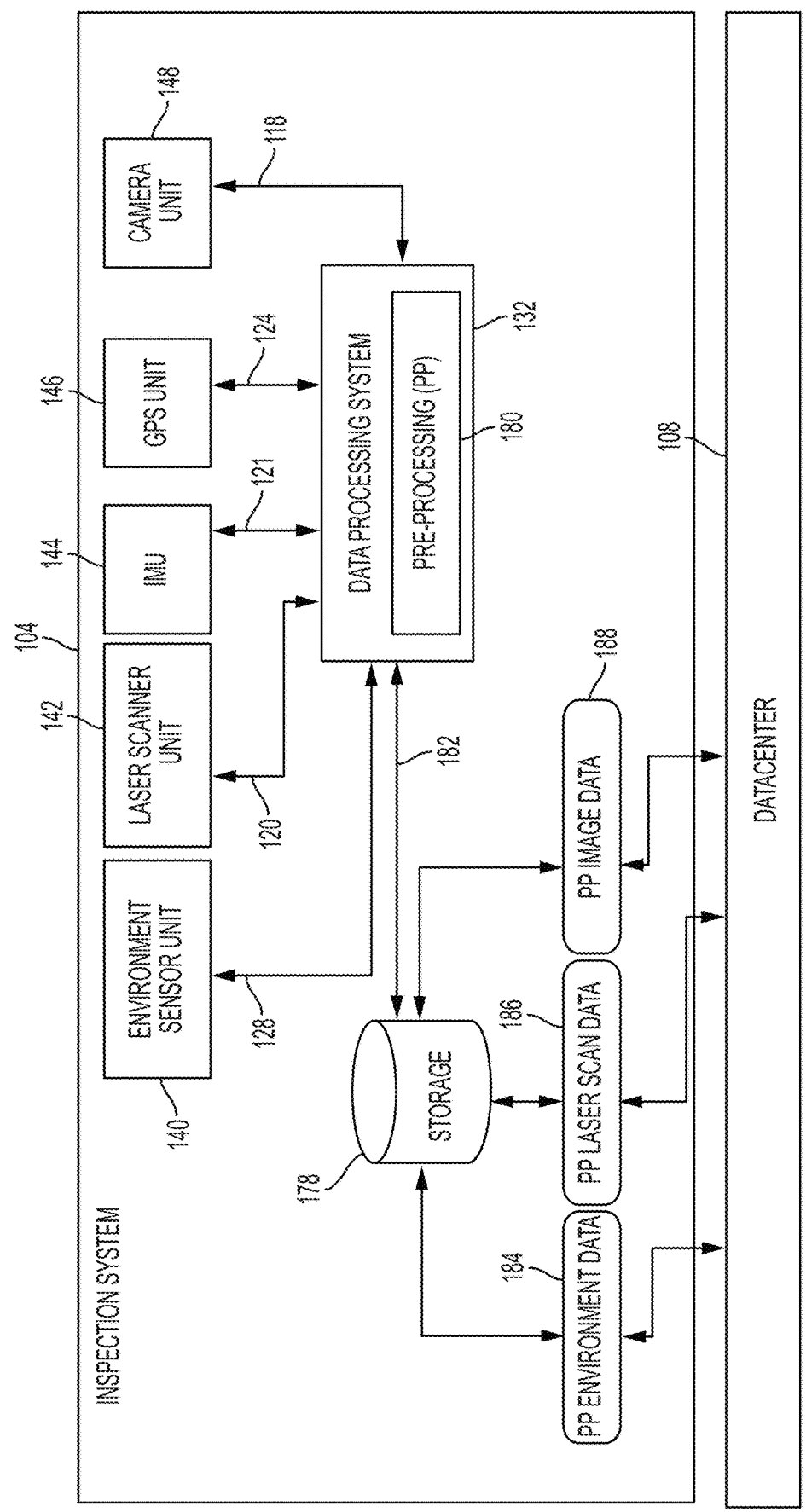
FIG. 4 is a block diagram of the inspection system of FIG. 1 and FIG. 2 further showing data flow according to an embodiment of the disclosure.

FIG. 4 is a block diagram of the inspection system 104 of FIG. 1 and FIG. 2 further showing data flow according to an embodiment of the disclosure. The inspection system 104 may comprise an environment sensor unit 140, a laser scanner unit 142, an inertial movement unit 144, a GPS unit 146, a camera unit 148, a data processing system 132, and storage 178 as discussed above. The inspection system 104 may further include a data processing system 132 (e.g., an embedded processor) including a pre-processing module 180 configured to perform pre-processing on the data to generate pre-processed (PP) data 182. The PP data 182 may be stored in local storage 178. The pre-processed (PP) data 182 may comprise PP environment data 184, PP laser-scan data 186, and PP image data 188.

In some embodiments, the pre-processing module 180 may be configured to perform tasks such as estimating the quality of the image data 118, making color corrections and/or brightness corrections to the image data 118, adjusting the resolution of the image data 118, and other suitable pre-processing adjustments of the area data 116. If the data processing system 132 determines that the quality of the image data 118 is not of sufficient quality, the inspection system 104 may be configured to re-collect data to improve the quality of the of the image data 118. The inspection system 104 may be configured further to adjust camera settings (e.g., shutter speed, aperture, zoom, etc.) before re-collecting image data 118. The pre-processing module 180 may further comprise synchronizing the image data 118, laser scan data 120, and environment data 128 with the geo-reference data 124 (e.g., geo-referencing the area data 116). In some embodiments, the pre-processing may include detecting the position of each tree by processing the image, determining the canopy outlines, and fusing this information with GPS data.

The pre-processing of the laser scan data 120 may generate the PP laser scan data 186 as a point cloud. In some embodiments, the environment data 128 may also be pre-processed, such as by filtering the environmental data to reduce noise from the measurements (e.g., by using statistical digital filters such as Kalman or particle filters).

The inspection system 104 may be configured to communicate the PP data 182 to the datacenter 108 during data collection or after data collection is complete. Alternatively, during operation, the inspection system 104 may capture all area data 116 and store the raw area data 116. During data collection, or after data collection is complete, the inspection system 104 may communicate the raw area data 116 to the datacenter 108 to perform pre-processing or other analysis. In some embodiments the datacenter 108, and not the inspection system 104, may handle all processing of the raw area data 116, including estimating the quality of the image data 118, and synchronizing and/or geo-referencing the area data 116.

Figure 5:
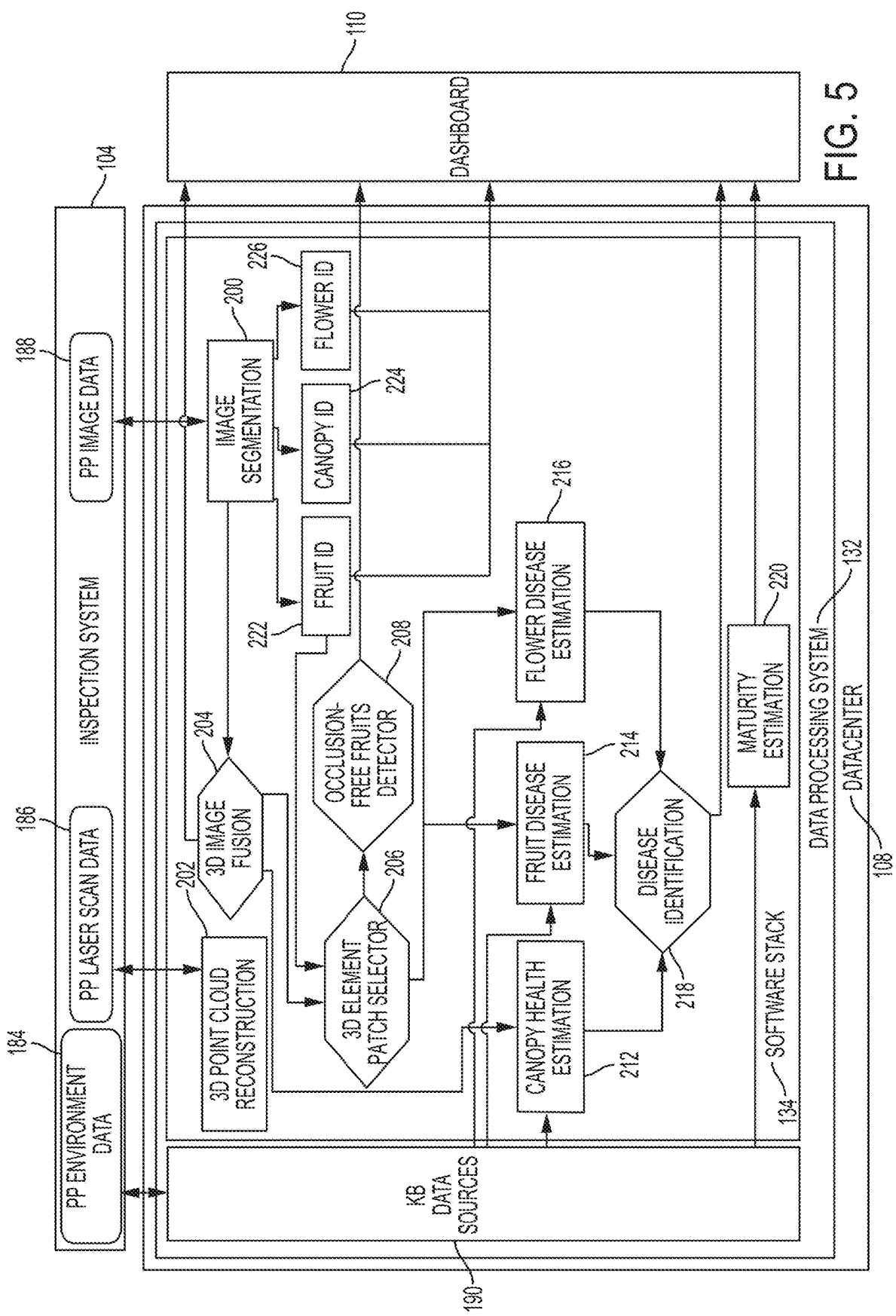
FIG. 5 is a simplified block diagram of the datacenter of FIG. 1 and FIG. 3 further showing data flow according to an embodiment of the disclosure.

FIG. 5 is a simplified block diagram of the datacenter 108 of FIG. 1 and FIG. 3 further showing data flow according to an embodiment of the disclosure. As discussed above, the datacenter 108 may comprise the data processing system 132 and the software stack 134. The software stack 134 may comprise instructions and program code for a data analysis module 136, data classification module 138, and a map generation module 139.

Figure 6:
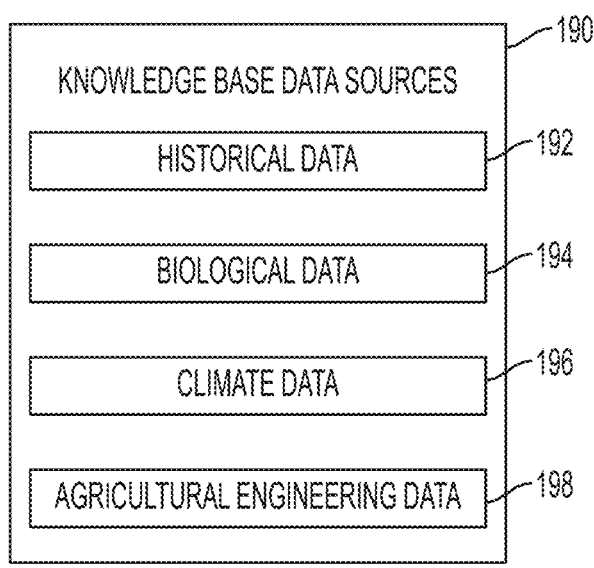
FIG. 6 is a block diagram showing various knowledge base data sources according to an embodiment of the disclosure.

The data processing system 132 may also comprise knowledge base (KB) data source 190. Referring briefly to FIG. 6, the KB data sources 190 may comprise plant area historical data 192, past biological data 194, past climate data 196, agricultural engineering data 198, and other suitable knowledge base data sources. The KB data sources 190 may contain relations between past climate data 196, past biological data 194, and agricultural engineering data 198 about the plant varieties (e.g., visual characteristics, nutritional characteristics, growth rates, expected reactions to weather and seasons, etc.), information about the area's historical yield, and records of fertilizers and pesticides applied. The KB data sources 190 may be used by the datacenter 108 to estimate likelihoods that diseases are affecting specific parts of the area and trigger alerts to the user. At least some of the data stored and updated within the KB data source 190 includes the PP environment data 184 captured by the inspection system 104.

Referring again to the processes within the software stack 134 of FIG. 5, the analysis modules and classification modules may comprise multiple blocks of instructions or program code. These blocks of instructions may include: image segmentation 200, point cloud reconstruction 202, and 3D image fusion block 204, 3D element patch selector block 206, occlusion-free fruits detector 208, identification (e.g., fruit ID 222, flower ID 226, canopy ID 224, etc.), health estimation blocks (e.g., canopy health estimation block 212, fruit disease estimation block 214, flower disease estimation block 216, disease identification block 218, etc.), and a maturity estimation block 220.

Image segmentation 200 may comprise receiving the PP image data 188 and identifying relevant objects (e.g., fruit, flower, leaf, branch, trunk, etc.) within the PP image data 188. For example, during image segmentation 200 the datacenter 108 may identify which parts of the PP image data 188 correspond to fruits 222 ("fruit ID"), tree canopy 224 ("canopy ID"), and flowers 226 ("flower ID"). The result of image segmentation 200 may allow for the counting of fruits and flowers on the trees with high accuracy. Thus, by identifying the portions of the PP image data 188 correspond to fruit ID 222, the instances of each fruit may be counted. Likewise, by identifying the portions of the PP image data 188 correspond to flowers 226, the instances of each flower within the image data 118 may be counted. In some embodiments, the counting may occur within the datacenter 108, while in other embodiments the counting may be performed by the dashboard 110. Additional details for image segmentation will be discussed below with respect to FIGS. 7 and 8.

Point cloud reconstruction 202 may comprise assembling 3D point clouds from captured laser scan data 120. This reconstruction may be in the format of a mesh of polygons. Additional details for point cloud reconstruction 202 will be discussed below with respect to FIG. 9.

The outputs of the image segmentation 200 and the point cloud reconstruction 202 may be provided to the image fusion block 204. The image fusion block 204 may registering to what point cloud each segmented image belongs; and assembling the in the form of 3D images. As a result, the 3D points describing the shape of the scenes and the corresponding visual and infra-red images may be merged into multi-dimensional surfaces that contain the image properties plus depth information. The image fusion block 204 may also be configured to generate a canopy volume estimation. The 3D images generated by image fusion block 204 are then passed on to the 3D element patch selector block 206.

The 3D element patch selector block 206 may utilize the information from the image segmentation stage to guide the extracting of the locations in the 3D image where fruits are (e.g., for 3D fruit image patches) and where flowers are (e.g., for 3D flower image patches). As a result, further processing of aspects of the fruits and/or flowers may be performed in an efficient manner by being limited areas of the 3D image where fruits and/or flowers are to be considered. The 3D element patch selector block 206 may comprise receiving the location of fruits and/or flowers on the images performed by the image segmentation block 200 and finding the corresponding fruits on the 3D image generated by the 3D image fusion block 204. The result may be a list of 3D fruit image patches and/or 3D flower image patches. The 3D fruit image patches may be provided to the fruit disease estimation block 214, and the 3D flower image patches may be provided to the flower disease estimation block 216.

The occlusion-free fruits detector 208 is configured to analyze 3D fruit image patches received from the 3D element patch selector block 206 to determine which of the 3D fruit patches are free from occlusion by other objects (e.g., leaves, branches, etc.). The image patches may be filtered (e.g., with de-noising and statistical filters) to remove noise from the image patches. In addition, the fruit diameter may be determined for each instance of fruit identified using corresponding 3D laser scan data 120 detected by the 3D element patch selector block 206. In some embodiments, the precision of this diameter determination may be within 10 mm.

The next several blocks (e.g., canopy health estimation block 212, fruit disease estimation block 214, flower disease estimation block 216) may perform health and/or disease estimation (e.g., fruit, flower and canopy), cross-relate information from the KB data sources 190, and determine probabilities of anomalies that may be caused by diseases and/or lack of nutrients or water. The KB data source 190 may include relationships between past climate data, biological and agronomic engineering knowledge about the fruit tree varieties (e.g., visual and nutritional characteristics, growth rates, expected reactions to weather and seasons), information about an orchard's historical yield, and the records of fertilizers and pesticides applied to the specific orchard. These blocks then output likelihoods that diseased are affecting specific parts of the orchard and trigger alerts to the clients.

The canopy health estimation block 212 may be configured to determine an estimation of canopy health. In particular, the canopy health estimation block 212 may calculate a Normalized Difference Vegetation Index (NDVI) from the 3D image data from the 3D image fusion block 204 and associate the NDVI with the biological knowledge base data 194 and the plant area historical data 192 from the KB data sources 190. The NDVI may be calculated from the visible and near-infrared light reflected by vegetation. Healthy vegetation absorbs most of the visible light that hits it, and reflects a large portion of the near-infrared light. Unhealthy or sparse vegetation reflects more visible light and less near-infrared light.

The fruit disease estimation block 214 may be configured to perform fruit anomaly detection. The fruit anomaly detection may comprise associating the characteristics of the fruit images of image data 118 (e.g., color, size, shape, etc.) with information from the climate data 196, biological data 194, and agricultural engineering data 198 from the KB data sources 190. The fruit disease estimation block 214 may comprise comparing the images of image data 118 to the dataset of problematic fruits and, using statistical inference, may infer the probability of anomalous conditions on the fruit.

The flower disease estimation block 216 may be configured to perform flower anomaly detection. The flower anomaly detection may comprise associating the characteristics of the flower images (e.g., color, size, shape, etc.) with information from the climate data 196, biological data 194, and agricultural engineering data 198 from the KB data sources 190. The flower disease estimation block 216 may comprise comparing the images of image data 118 to the dataset of problematic flowers and, using statistical inference, may infer the probability of anomalous conditions on the flower.

The disease identification block 218 may receive the outputs (e.g., probabilities of anomalous conditions) from each of the canopy health estimation block 212, the fruit disease estimation block 214, and the flower disease estimation block 216 and determine whether a disease is present for a plant in the plant area, and if so, a determined identity (e.g., diagnosis) for that disease. The result of the disease identification block 218 may then be transmitted to the dashboard 110.

The maturity estimation block 220 may be configured to use information from the KB data sources 190 to correlate the information contained with the fruit counts, fruit diameters, and classification labels of that specific variety of fruit (e.g., from the image segmentation block). For example, the maturity estimation block 220 may classify the maturity stage of the tree by correlating the data about the maturing class and diameter of each fruit with the processed biological knowledge base data 194 and the plant area historical data 192. The maturity stage estimate may also be used by the datacenter 108 to predict a desired ripening date and provide a recommendation for the application of particular nutrients and/or fertilizers to try to align the ripening data with the desired ripening date from the current maturity stage estimate.

In some embodiments, the dashboard 110 may receive the various outputs (e.g., fused 3D image data, segmented images and associated ID, geo-reference data, environment data, disease estimates and identification, maturity estimation, etc.) from the datacenter 108 to be displayed in various formats (e.g., charts, graphs, lists, etc.) on a graphical user interface of the dashboard 110. As a result, properties may be presented to the user via the dashboard 110 including growth stage, estimated crop yield, estimated plant health, disease estimate, nutrient deficiency estimate, fruit quantity, flower quantity, fruit size, fruit diameter, tree or vine height, trunk or stem diameter, trunk or stem circumference, tree or vine volume, canopy volume, color, leaf color, leaf density, temperature, humidity, sunlight levels, abnormalities, wind speed, wind direction, altitude, air pressure, time, or other suitable properties. The datacenter 108 may also be configured to generate various notifications, alerts, and/or recommendations responsive to analyzing the data that may also be transmitted (e.g., pushed) to the dashboard 110.

As discussed above, the dashboard 110 may display a map of the plant area with icons and/or other indicators representing different plants, fruits, flowers, etc., and associated data determined from the analysis presented herein. In some embodiments, the map may be generated at the device associated with the dashboard 110. Thus, the processing of the output data and construction of the map may be performed by the device remote from the datacenter 108. In addition, counting instances of fruits, flowers, etc., may also be performed at the device remote from the datacenter 108. In another embodiment, the datacenter 108 may be perform the processing and analysis to generate the map. As a result, the dashboard 110 may simply be configured as a thin client that retrieves and displays the map data created by datacenter 108.

Figure 7:
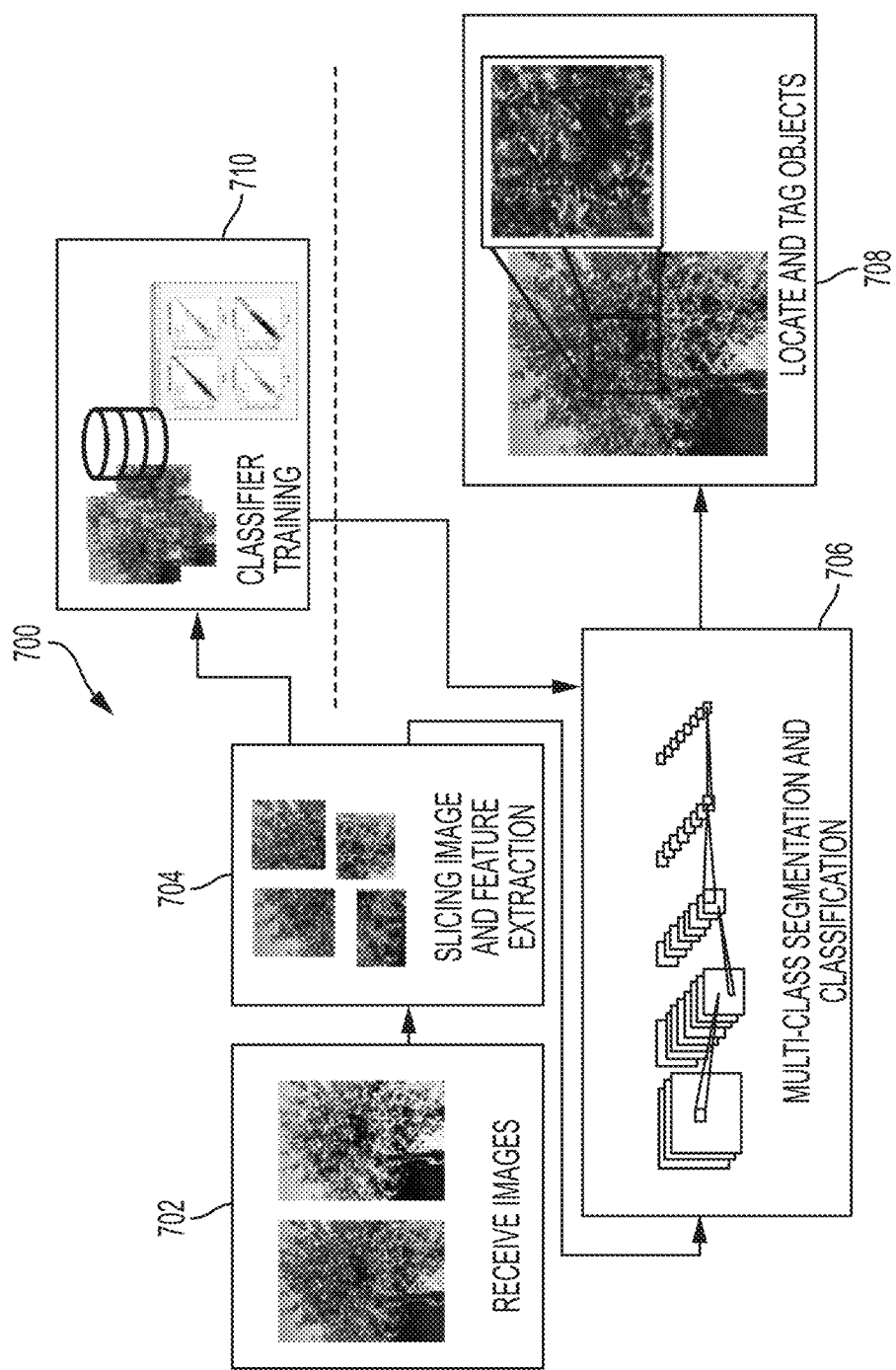
FIG. 7 is a flowchart illustrating a method for image segmentation according to an embodiment of the disclosure.

FIG. 7 is a flowchart 700 illustrating a method for image segmentation according to an embodiment of the disclosure. In particular, the method may provide additional description for the image segmentation block 200 of FIG. 5 as executed by the processor of the datacenter 108. The image segmentation block receives the images from the sensor hardware, identifies relevant features within the images, and identifies which extracted features within the image corresponds to fruits, flowers, and the tree canopy.

At operation 702, the processor may receive the image data from the inspection system. The image data may include color images captured by a camera and/or infrared images captured by an IR camera. The processor may also perform pre-processing on the images in some embodiments, such as color and brightness correction, resolution adjustment, filtering, edge or contrast enhancements, etc.

At operation 704, the (pre-processed) image data may be sliced into smaller parts for feature extraction. Slicing the data into smaller parts may enable faster processing of image data, particularly for high resolution images. During feature extraction, parameters such as color, textures, geometries, sizes are extracted by several feature detectors.

At operation 706, these features are then sent to the supervised learning classifiers that have been trained from a large number of examples to classify features jointly on so called 'classes' of objects (e.g., green fruit, ripe-ready fruit, sick fruit, sick leaves and flowers) according to multi-class segmentation and object classification. The classification is scale invariant, and the number of classes is variable. The classifiers output the location of the objects on the image, as well as the image area where the tree's canopy is located.

At operation 708, each location may be tagged with a label describing the class of the element and a scalar number representing the confidence to which it belongs to the class. The supervised learning classifiers may include deep neural networks and support vector machines that have been trained from a large number of examples to classify classes of objects. Support vector machines are supervised learning models with associated learning algorithms that analyze data used for classification and regression analysis. For example, given a set of training examples, each marked as belonging to one or the other of two categories, the supervised learning process builds a model that assigns new examples to one category of the other. This is an example of a non-probabilistic binary linear classifier. However, the supervised learning classifiers may be probabilistic classifiers and may be further configured to assign a scalar number representing a confidence level associated with the classification. For example, the scalar number may range from 1 to 99. 99 may represent a confidence level near absolute certainty and 1 may represent near absolute uncertainty. Other confidence scales and ranges are also contemplated.

At operation 710, the classifier may be trained during each segmentation and classification process for further improving classification for subsequent use. The training may include further analyzing the dataset depending on the variety of the fruit and other agricultural engineering parameters, and also learn new types of elements by defining new classes that did not exist previously.

Figure 8:
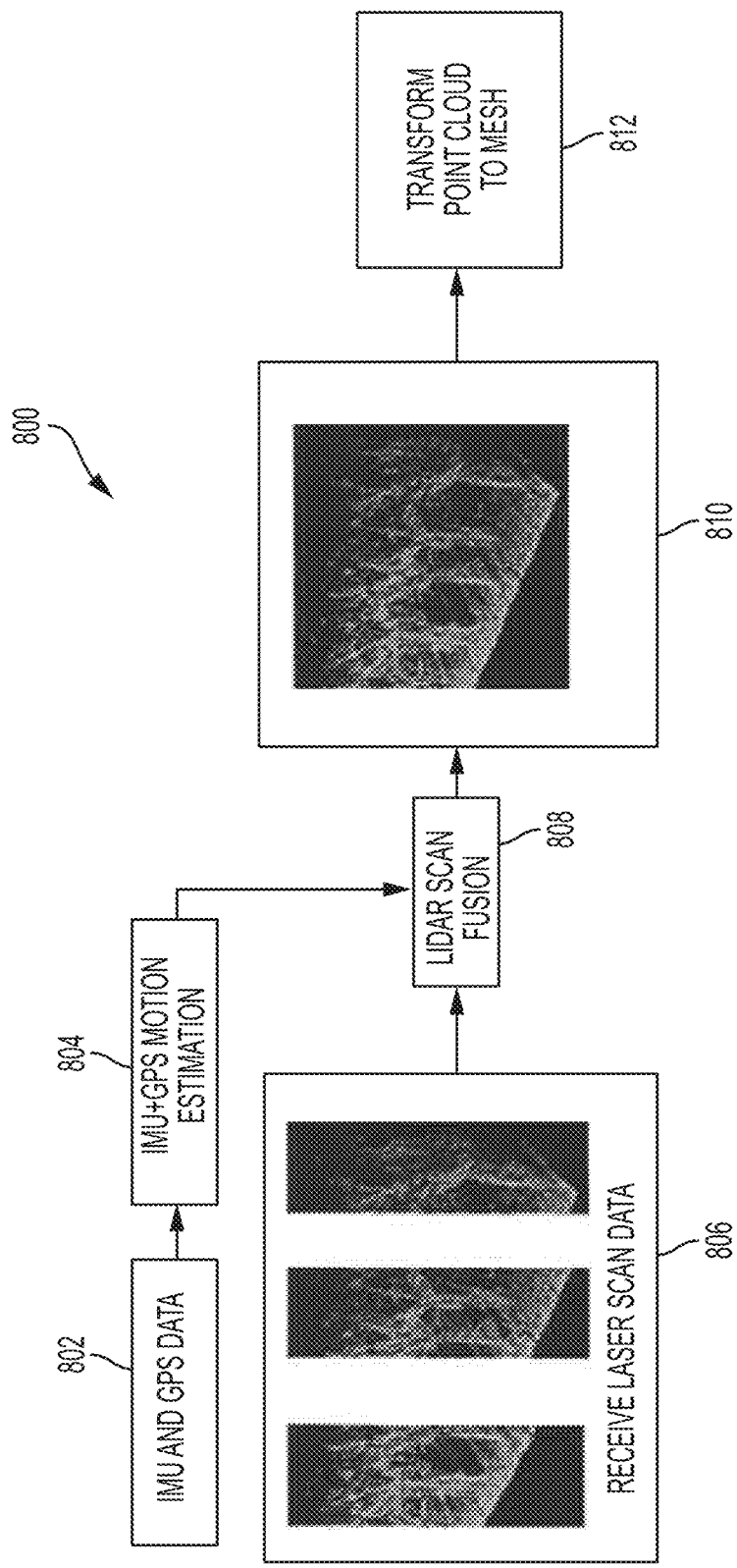
FIG. 8 is a flowchart illustrating a method for point cloud reconstruction of a plant according to an embodiment of the disclosure.

FIG. 8 is a flowchart 800 illustrating a method for point cloud reconstruction of a plant according to an embodiment of the disclosure. In particular, the method may provide additional description for the point cloud reconstruction 202 of FIG. 5. The point cloud reconstruction may be assembled from captured LiDAR scans.

At operation 802, the processor may receive positioning data (e.g., IMU data and GPS data). At operation 804, the IMU data and the GPS data are fused using the gyros, accelerometer and compass of the IMU to measure any inclination or vibration the inspection system experienced at the time the LiDAR scan was performed and to augment the precision of the GPS measurement which provides the global position in reference to the Earth frame.

At operation 806, the processor may receive laser scan data and be fused (operation 808) with the IMU/GPS motion estimation through a process such as an iterative closest point (ICP) and a reconstructed LiDAR point cloud is produced (operation 810). ICP is an algorithm employed to minimize the difference between two clouds of points. ICP is often used to reconstruct 2D and/or 3D surfaces from different laser scans. Each iteration of these processes, a new LiDAR scan may be retrieved and, based on the timestamps, matched with the corresponding pose and position of the sensor. At operation 812, the point cloud may be transformed into a mesh of polygons after having its normal computed.

Figure 9:
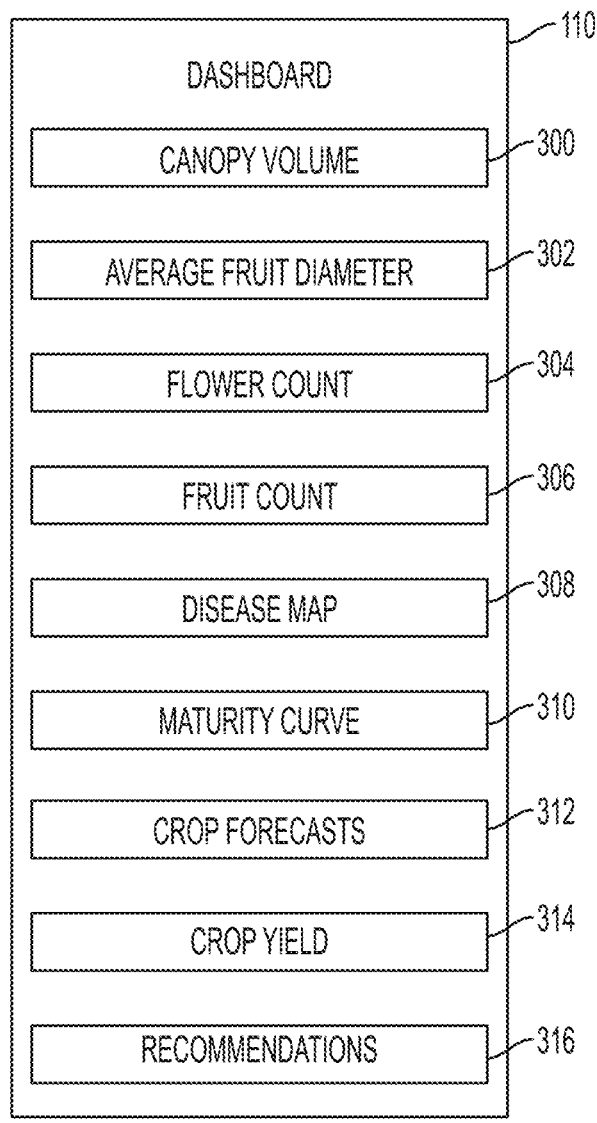
FIG. 9 is a schematic block diagram representing the dashboard according to embodiments of the disclosure.

FIG. 9 is a schematic block diagram representing the dashboard 110 according to embodiments of the disclosure. The dashboard 110 may comprise estimations presented to the user, which may consolidate the area data 116. The dashboard 110 may provide visualization by specific periods or ranges of dates. The dashboard 110 may show the evolution of the plant area over time. The dashboard may allow comparison between periods. The dashboard 110 may display crop forecasts 312 and/or crop yield 314. The dashboard 110 may display recommendations 316 to the famer on whether to adjust the amount of pesticides, fertilizers, water, and/or other suitable adjustments. The dashboard 110 may display information about the plant area (e.g., orchard) such as canopy volume 300, average fruit diameter 302, fruit count 306, flower count 304, maturity curve 310, and a disease map 308. In some embodiments, the dashboard 110 may present the results of the above analysis in the form of a map, as charts or graphs, as numerical information, as an animation, or other forms of graphically presenting information to the user. The dashboard 110 may include input fields or other interactive features to filter data, change data fields shown by the dashboard, change date ranges or other features as desired by the user.

Figure 10:
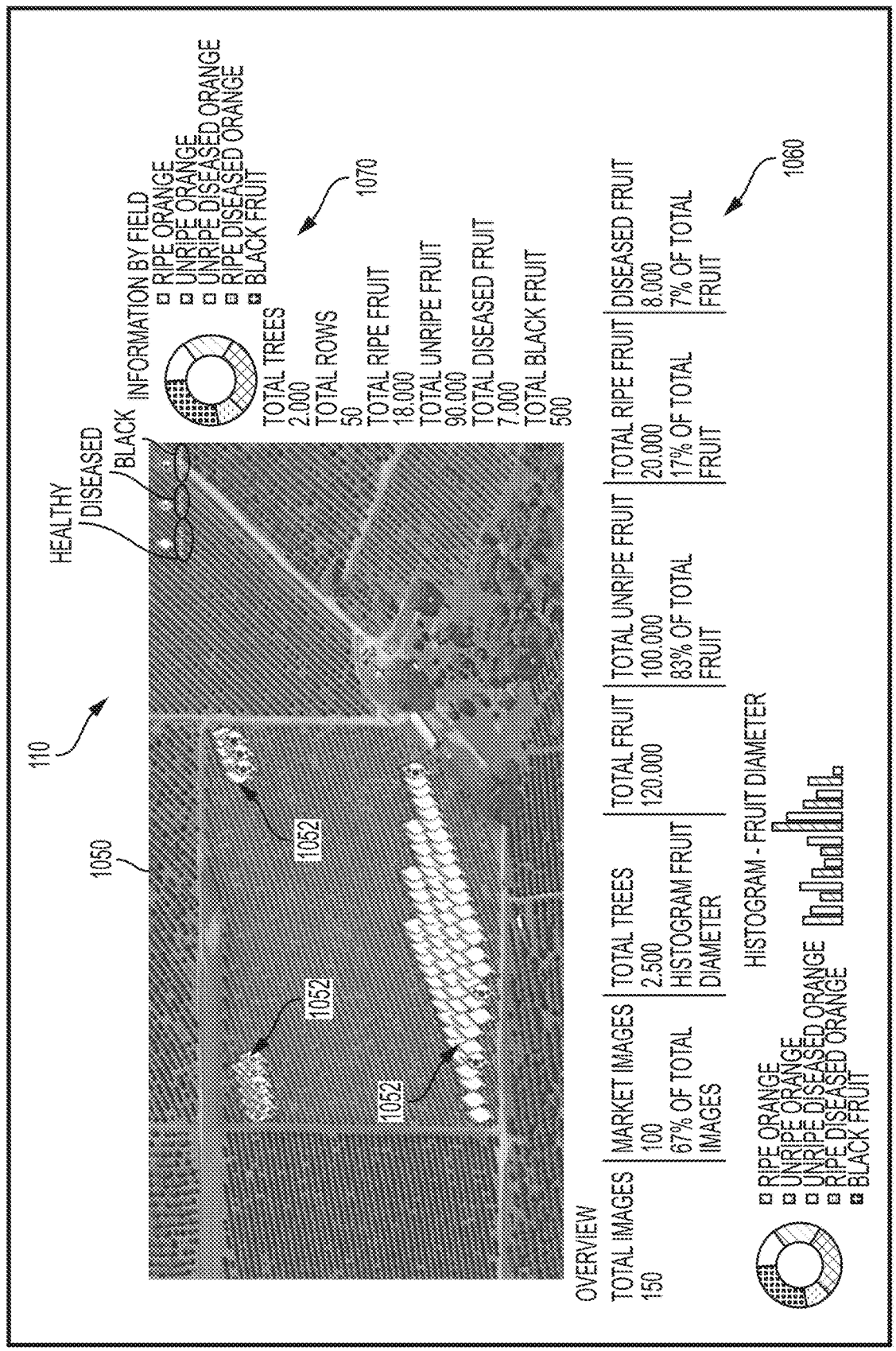
FIG. 10 is a screenshot of an exemplary view of the dashboard according to embodiments of the disclosure.

FIG. 10 is a screenshot of an exemplary view of the dashboard 110 according to embodiments of the disclosure. The dashboard 110 may include a map 1050 showing the plant area being surveyed. The map 1050 may include icons 1052 representative of an instance of a plant (or portion thereof) that has been analyzed and classified according embodiments herein. The geolocation data may be used to assign the location of the icon on the map to be the proper location relative to the other data measurements. The icons may be represented differently to indicate certain classifications (e.g., healthy, diseased, black (i.e., rotten)) for easy understanding by the user. The map may be an interactive map that enables the user to select properties, individually or in groups, to view in the map. In another example, the dashboard 110 may be configured to enable the user to select one of the icons 1052 to view additional data specifically assigned to that icon. For example, selecting an icon 1052 may cause the image data to open and be viewable by the user. Additional data, such as health or disease information may be viewable for each specific icon when selected. In addition, the dashboard 110 may include filtering features that enable the user to only show certain information according to common classifications. For example, if a user only desires to see where ripe fruit has been identified, the user may make such a selection and the icons related to unripe fruit may be removed from view on the map 1050 for the user to more easily identify. Similar selections may be possible for viewing only diseased fruit or rotten fruit.

The dashboard 110 may also include additional aggregated information such as an overview 1060 that shows information for an entire plant area such as the total images available for that area, marked images, total trees identified within the images, total fruit identified within the images, a histogram of fruit diameter over time, a total number of fruit that is not ripe, a total number of fruit that is ripe, and a total of diseased fruit. Another area may be dedicated to providing similar information a specific field 1070 of a larger area. In some embodiments, the dashboard 110 may also display information from the KB data sources about the selected tree variety, the farm, and/or cultivar, or from external data sources such as a farmer's database including dates and details about the application of fertilizer, irrigation, disease treatment, etc.

Figure 11:
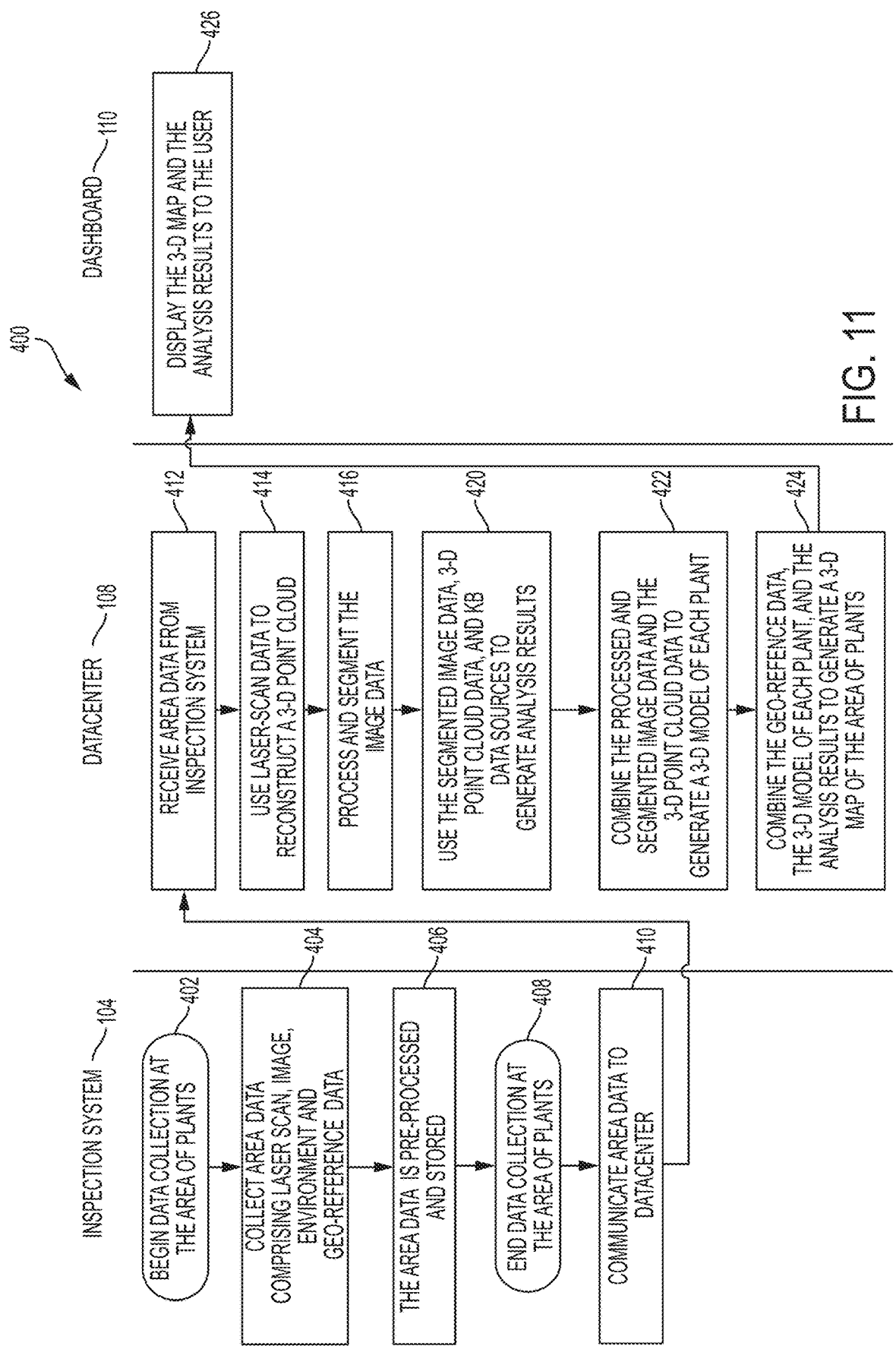
FIG. 11 is a flowchart illustrating a method for generating a map of a plant area showing area data in the map.

FIG. 11 is a flowchart 400 illustrating a method for generating a map 114 of a plant area showing area data 116 in the map 114. In operation, the inspection system 104 begins collection of area data 116, 402. The inspection system 104 collects area data 116 comprising laser scan data 120, image data 118, environment data 128, and geo-reference data 124 of data 404. The area data 116 is pre-processed by the inspection system 104 and stored 406. The data collection ends 408. The area data 116 is communicated to the datacenter 108, 410. The datacenter 108 receives the area data 116 from the inspection system 104, 412. The datacenter 108 uses the laser scan data 120 to reconstruct a 3D point cloud 414. The datacenter 108 processes and segments the image data 118, 416. The datacenter 108 uses the segmented image data, 3D point cloud data, and KB data sources 190 to generate analysis results 126, 420. The datacenter 108 combines the processed and segmented image data and the 3D point cloud data to generate a 3D model of each plant 422. The datacenter 108 combines the geo-reference data 124, the 3D model of each plant, and the analysis results 126 to generate a 3D map 114 of the plant area 424. The dashboard 110 displays the 3D map 114 and the analysis results 126 to the user 426.

In other embodiments, the datacenter 108 may analyze and classify the area data 116 and output at least one of a group of: 3D tree images, 3D vine images, 3D fruit images, fruit diameter estimations, trunk diameter estimations, vine diameter estimations, maturity stage estimations, canopy health estimations, flower anomalies, fruit anomalies, leaf anomalies and other suitable estimations.

The datacenter 108 may generate a 2D and/or 3D map showing at least one of a group of: 3D tree images, 3D vine images, 3D fruit images, fruit diameter estimations, trunk diameter estimations, vine diameter estimations, maturity stage estimations, canopy health estimations, flower anomalies, fruit anomalies, leaf anomalies and other suitable estimations.

The 2D and/or 3D map 114 may include different colors or gray scales, depending on the area data 116. The 3D map 114 may also include various icons indicating various properties within the plant area. The digital 3D map 114 may also include various notifications and/or alerts indicating various properties within the surveyed plant area. In some embodiments, the 3D map 114 may include graphical representations, including 2D and 3D graphical representations, indicating and/or modeling the various properties within the plant area.

The datacenter 108 may generate recommendations (e.g., pesticide adjustments, fertilizer adjustments, irrigation and water adjustments, and other suitable adjustments). The 2D and/or 3D map and recommendations may be viewed by the user on the dashboard 110.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventor.

What is claimed is:

1. A crop yield estimation system for detecting one or more properties of a plant area, the crop yield estimation system comprising:
    an inspection system mountable to a transport device, the inspection system comprising:
        a global positioning system;
        an imaging system;
        at least one processor; and
        at least one non-transitory computer-readable storage medium storing instructions thereon that, when executed by the at least one processor, cause the inspection system to:
            capture image data of the plant area via the imaging system;
            receive geolocational data via the global positioning system; and
            associate, at the inspection system, image data with the received geolocational data; and
    a datacenter remote from the inspection system, the datacenter configured to:
        receive the image data and the geolocational data from the inspection system;
        analyze the image data and the geolocational data via one or more machine learning techniques to identify the one or more properties of the plant area and locations of the one or more properties; and
        responsive to the identified one or more properties, generate one or more automated recommendations for at least one of a dosing of fertilizers, a dosing of pesticides, an amount of irrigation, types of fertilizers, or types of pesticides in one or more areas of the plant area; and
    a dashboard configured to display the generated one or more automated recommendations.

2. The crop yield estimation system of claim 1, wherein the inspection system further comprises at least one of an environment sensor unit, an inertial movement unit, or a radio unit.

3. The crop yield estimation system of claim 1, wherein capturing the image data of the plant area via the imaging system further comprises capturing at least three-dimensional (3D) and two-dimensional (2D) data.

4. The crop yield estimation system of claim 3, wherein the at least one non-transitory computer-readable storage medium stores additional instructions thereon that, when executed by the at least one processor, cause the inspection system to generate preprocessed data including determining one or more of a color, brightness, and resolution of the image data.

5. The crop yield estimation system of claim 4, wherein generating preprocessed data further includes correcting the color of the image data.

6. The crop yield estimation system of claim 4, wherein generating preprocessed data further includes correcting the brightness of the image data.

7. The crop yield estimation system of claim 4, wherein generating preprocessed data further includes adjusting the resolution of the image data.

8. The crop yield estimation system of claim 4, wherein generating the pre-processed data further comprises determining if the one or more of the color, the brightness, or the resolution of the image data is below a threshold requirement, and recapturing the image data until the one or more of the color, the brightness, or the resolution of the image data meets the threshold requirement.

9. The crop yield estimation system of claim 4, wherein the datacenter is further configured to determine and generate output data based at least partially on the pre-processed data, wherein the output data comprises at least one of growth stage, estimated crop yield, estimated crop forecast, estimated plant health, disease estimate, nutrient deficiency estimate, fruit quantity, flower quantity, fruit size, fruit diameter, tree or vine height, trunk or stem diameter, trunk or stem circumference, tree or vine volume, canopy volume, color, leaf color, leaf density, plant abnormalities, historical data, biological data, and agricultural engineering data.

10. A crop yield estimation system for generating a map of a plant area indicating at least one property of the plant area, the system comprising:
    an inspection system comprising:
        a global positioning system;
        an imaging system;
        a communication system;
        at least one processor; and
        at least one non-transitory computer-readable storage medium storing instructions thereon that, when executed by the at least one processor, cause the inspection system to:
            capture image data of the plant area via the imaging system;
            receive geolocational data via the global positioning system;
            associate, at the inspection system, the image data with the received geolocational data; and
            generate pre-processed data including the image data and the associated geolocational data;
    a datacenter remote from the inspection system and in communication with the inspection system via the communication system, wherein the datacenter is configured to:

receive the pre-processed data from the inspection system;

analyze the pre-processed data via one or more machine learning techniques to identify the at least one property of the plant area and locations of the identified at least one property;

responsive to the identified at least one property, generate one or more automated recommendations for at least one of a dosing of fertilizers, a dosing of pesticides, an amount of irrigation, types of fertilizers, or types of pesticides in one or more areas of the plant area;

generate a map of the plant area using the identified at least one property of the plant area and a location of the identified at least one property, wherein the map includes at least one icon indicating the identified at least one property, wherein a position of the at least one icon within the map correlates to the location of the identified at least one property; and a dashboard configured to display the map and the generated one or more automated recommendations.

11. The crop yield estimation system of claim 10, wherein the imaging system comprises at least one of a high-definition infrared camera, an inertial movement unit, stereoscopic cameras, a laser scanner (LiDAR), or a radio unit.

12. The crop yield estimation system of claim 10, wherein capturing the image data of the plant area via the imaging system further comprises capturing at least three-dimensional (3D) and two-dimensional (2D) data.

13. The crop yield estimation system of claim 12, wherein the datacenter comprises:

a data processing system comprising a communications framework, a processor unit, memory, persistent storage, a communications unit, an input/output unit, knowledge base data sources, and a software stack;

wherein the datacenter is configured to:
reconstruct three-dimensional (3D) point cloud data using the at least three-dimensional (3D) image data and two-dimensional (2D) image data captured via the imaging system;

segment the at least three-dimensional (3D) image data and two-dimensional (2D) image data to generate segmented image data;

use the segmented image data, the reconstructed three-dimensional (3D) point cloud data, and the knowledge base data sources to identify the at least one property of the plant area;

combine the segmented image data and the reconstructed three-dimensional (3D) point cloud data to generate a three-dimensional (3D) model of each plant of the plant area; and combine the three-dimensional (3D) model of each plant and the identified at least one property of the plant area to generate the map of the plant area.

14. A method for generating a map of a plant area indicating one or more properties of one or more plants in the plant area, the method comprising:

moving an inspection system across the plant area;
capturing image data of the plant area via an imaging system;

receiving geolocational data from a global positioning system;

associating, at the inspection system, the image data with the received geolocational data;

generating pre-processed data including the image data and the associated geolocational data;

transmitting, from the inspection system and to a datacenter remote from the inspection system, the pre-processed data;

analyzing, with the datacenter, the pre-processed data via one or more machine learning techniques to identify the one or more properties of the plant area and locations of the one or more properties;

responsive to the identified one or more properties, generating one or more automated recommendations for crop management in one or more areas of the plant area and predicting one or both of a ripening date or a size of fruit of plants within the plant area;

generating, with the datacenter, a three-dimensional map using the image data, the one or more automated recommendations to adjust the ripening date of the fruit of the plants within the plant area, and the one or more areas of the plant area associated with the one or more automated recommendations, in which indications of the one or more automated recommendations are visible in the map in positions correlating to the onethe one or more areas of the plant area associated with the one or more automated recommendations; and displaying the map on dashboard viewable by a user and the generated one or more automated recommendations.

15. The method of claim 14, wherein capturing the image data of the plant area via the imaging system further comprises capturing at least three-dimensional (3D) and two-dimensional (2D) data.

16. The method of claim 15, wherein generating the map of the plant area comprises:

reconstructing three-dimensional (3D) point cloud data using the captured at least three-dimensional (3D) image data and the two-dimensional (2D) image data;

segmenting the at least three-dimensional (3D) image data and the two-dimensional (2D) image data to generate segmented image data;

combining the segmented image data and the three-dimensional (3D) point cloud data;

generating a three-dimensional (3D) model of each plant of the plant area based at least partially on the combined segmented image data and three-dimensional (3D) point cloud data; and combining the geolocational data, the three-dimensional (3D) model of each plant, the identified one or more properties, and the locations of the identified one or more properties to generate the map of the plant area.

17. The method of claim 14, further comprising segmenting the pre-processed data to identify which parts of the pre-processed data correspond to fruits, tree canopy, and flowers.

18. The method of claim 17, further comprising determining which identified fruits are free from occlusion by other objects.

* * * * *

UNITED STATES PATENT AND TRADEMARK OFFICE
CERTIFICATE OF CORRECTION

PATENT NO. : 11,580,731 B2  
APPLICATION NO. : 17/146776  
DATED : February 14, 2023  
INVENTOR(S) : Jose Angelo Gurzoni, Jr. et al.

Page 1 of 1

It is certified that error appears in the above-identified patent and that said Letters Patent is hereby corrected as shown below:

In the Claims

Claim 14, Column 22, Lines 25-26, change "to the onethe one or" to --to the one or--

Signed and Sealed this
Twenty-first Day of May, 2024

Katherine Kelly Vidal
*Director of the United States Patent and Trademark Office*